(12) United States Patent
Ohmori et al.

(10) Patent No.: US 11,309,547 B2
(45) Date of Patent: Apr. 19, 2022

(54) FUEL CELL SEPARATOR MEMBER AND FUEL CELL STACK

(71) Applicant: HONDA MOTOR CO., LTD., Tokyo (JP)

(72) Inventors: Suguru Ohmori, Wako (JP); Takuro Okubo, Wako (JP); Shuhei Goto, Wako (JP); Akihito Giga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 16/876,178

(22) Filed: May 18, 2020

(65) Prior Publication Data

US 2020/0388858 A1 Dec. 10, 2020

(30) Foreign Application Priority Data

May 21, 2019 (JP) .............................. JP2019-095041

(51) Int. Cl.
*H01M 8/0206* (2016.01)
*H01M 8/0267* (2016.01)
*H01M 8/0273* (2016.01)
*H01M 8/248* (2016.01)

(52) U.S. Cl.
CPC ....... *H01M 8/0206* (2013.01); *H01M 8/0267* (2013.01); *H01M 8/0273* (2013.01); *H01M 8/248* (2013.01)

(58) Field of Classification Search
CPC ............. H01M 8/0267; H01M 8/2483; H01M 8/0206; H01M 8/0247; H01M 8/0263; H01M 8/023; H01M 8/0297; H01M 8/1004; H01M 8/248
See application file for complete search history.

(56) References Cited

U.S. PATENT DOCUMENTS

| | | | |
|---|---|---|---|
| 8,371,587 B2 * | 2/2013 | Fly ...................... | H01M 8/2483 277/594 |
| 2006/0061045 A1 * | 3/2006 | Burg .................... | F16J 15/0818 277/593 |
| 2018/0145353 A1 | 5/2018 | Yang et al. | |
| 2018/0287181 A1 * | 10/2018 | Rock ................... | H01M 8/0247 |

* cited by examiner

*Primary Examiner* — Helen Oi K Conley
(74) *Attorney, Agent, or Firm* — Amin, Turocy & Watson, LLP (57) ABSTRACT

A fuel cell separator member of a fuel cell stack includes a metal separator on which a seal bead is formed, and a pressure receiving member provided on a surface of the metal separator, separately from the metal separator. The pressure receiving member is provided along a seal bead, and the height of the pressure receiving member is lower than the height of the seal bead in the state where the tightening load is applied and no impact load is applied.

18 Claims, 8 Drawing Sheets

FUEL CELL SEPARATOR MEMBER AND FUEL CELL STACK

CROSS-REFERENCE TO RELATED APPLICATION

This application is based upon and claims the benefit of priority from Japanese Patent Application No. 2019-095041 filed on May 21, 2019, the contents of which are incorporated herein by reference.

BACKGROUND OF THE INVENTION

Field of the Invention

The present invention relates to a fuel cell separator member and a fuel cell stack.

Description of the Related Art

The fuel cell stack includes a stack body formed by stacking a plurality of power generation cells. The power generation cells each include a membrane electrode assembly (MEA) and a pair metal separators provided on both sides of the MEA. The MEA includes an electrolyte membrane and electrodes provided on both sides of the electrolyte membrane. A tightening load in a stacking direction is applied to the stack body.

Each of the pair of metal separators is provided with a seal bead. The seal bead protrudes from a surface of the metal separator where an MEA is positioned (e.g., see the specification of U.S. Patent Application Publication No. 2018/0145353). The seal bead is pressed against a resin frame provided on an outer peripheral side of the MEA by the tightening load to prevent leakage of fluid which is a reactant gas or a coolant.

SUMMARY OF THE INVENTION

At the time of applying the tightening load, in the case where positions of seal beads of the pair of metal separators are shifted from each other in a surface direction perpendicular to the stacking direction, moment is applied to the metal separators. As a result, the seal surface of the seal bead is inclined from the surface direction, and the sealing performance of the seal bead may be lowered.

Further, for example, in the case where the fuel cell stack is mounted in the vehicle, when vehicle collision occurs, the impact load (external load) may be applied to the fuel cell stack in the stacking direction of the stack body. In this case, since the impact load is concentrated on the seal bead, the seal bead may be deformed (plastically deformed) undesirably.

The present invention has been made taking such a problem into consideration, and an object of the present invention is to provide a fuel cell separator member and a fuel cell stack which make it possible to achieve the desired sealing performance of a seal bead, and improve the impact load resistance characteristics.

According to an aspect of the present invention, provided is a fuel cell separator member including a metal separator stacked on a membrane electrode assembly in a stacking direction, a tightening load in the stacking direction being applied to the metal separator, a seal bead protruding from a surface of the metal separator where the membrane electrode assembly is positioned being formed on the metal separator, the seal bead being pressed against a resin frame provided on an outer peripheral side of a power generation surface of the membrane electrode assembly by the tightening load to prevent leakage of fluid comprising a reactant gas or a coolant, the fuel cell separator member further including a pressure receiving member provided on the surface of the metal separator, separately from the metal separator and configured to receive an impact load in the stacking direction, wherein the pressure receiving member is provided along the seal bead, and a height of the pressure receiving member in the stacking direction is lower than a height of the seal bead in the stacking direction in a state where the tightening load is applied and the impact load is not applied.

According to another aspect of the present invention, provided is a fuel cell stack including a stack body including a plurality of stacked power generation cells each including a membrane electrode assembly and a fuel cell separator member provided on each of both sides of the membrane electrode assembly, wherein the fuel cell separator member is the above fuel cell separator member.

In the present invention, when moment is generated in the metal separator, it is possible to bring the pressure receiving member into contact with the resin frame to receive the moment. Therefore, it is possible to suppress inclination of the seal surface of the seal bead from the surface direction. Further, since the height of the pressure receiving member is lower than the height of the seal bead, it is possible to reliably apply the tightening load to the seal bead. Therefore, it is possible to achieve the desired sealing performance of the seal bead. Further, when the impact load is applied to the seal bead in the stacking direction, and the seal bead is deformed by compression (elastically deformed) in the stacking direction, it is possible to receive the impact load by the pressure receiving member. Therefore, since concentration of the impact load on the seal bead can be suppressed, it is possible to improve the impact load resistance characteristics.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a fuel cell separator member and a fuel cell stack according to the present invention will be described with reference to the accompanying drawings.

Figure 1:
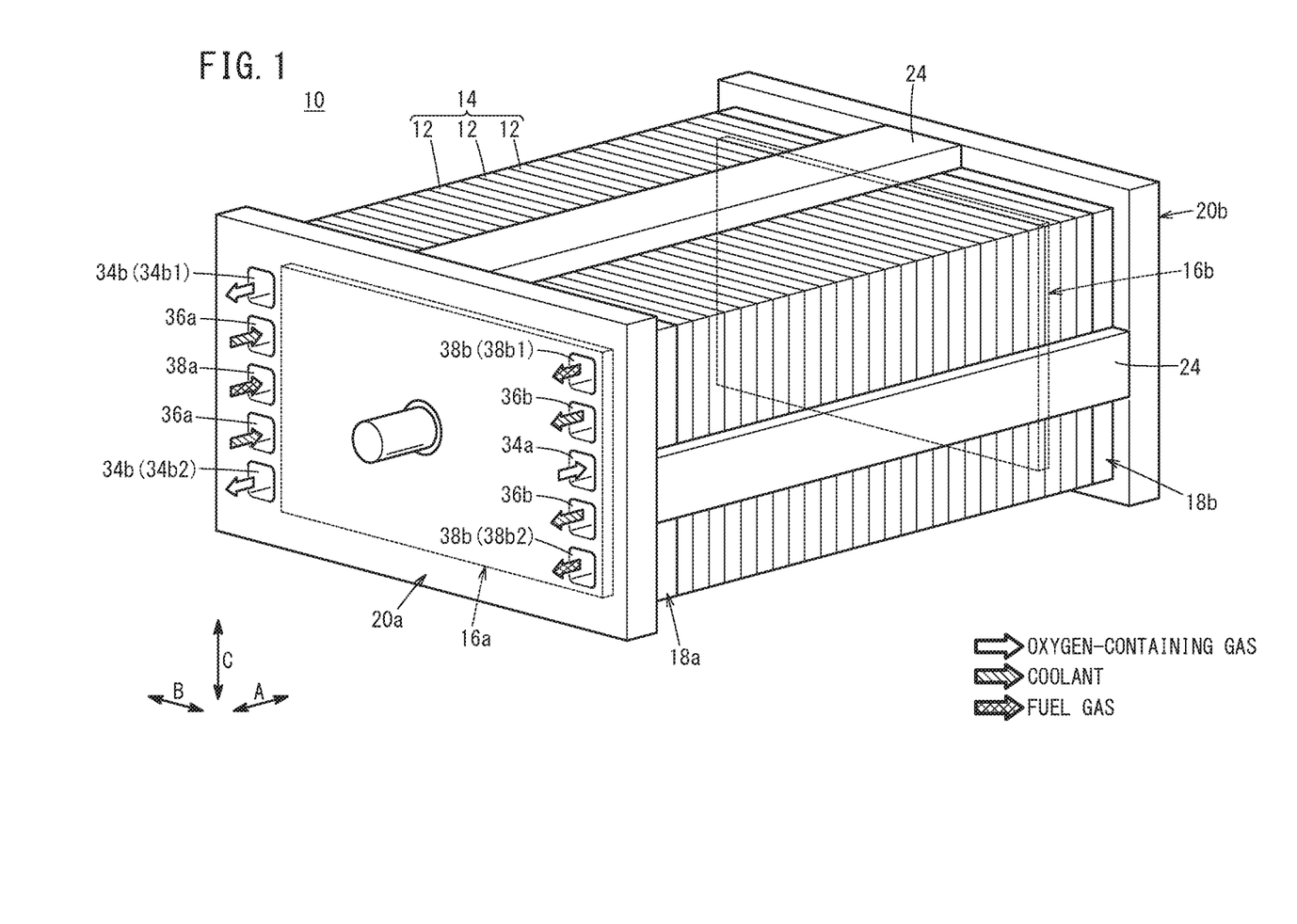
FIG. 1 is a perspective view showing a fuel cell stack according to an embodiment of the present invention.

As shown in FIG. 1, a fuel cell stack 10 according to the embodiment of the present invention includes a stack body 14 formed by stacking a plurality of power generation cells 12 in a horizontal direction (indicated by an arrow A) or in the gravity direction (indicated by an arrow C). For example, the fuel cell stack 10 is mounted in a fuel cell vehicle such as a fuel cell electric automobile (not shown).

At one end of the stack body 14 in the stacking direction indicated by the arrow A, a terminal plate 16a is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside the terminal plate 16b, and an end plate 20b is provided outside the insulator 18b. The insulator 18a (one of the insulators) is provided between the stack body 14 and the end plate 20a (one of the end plates). The insulator 18b (the other of the insulators) is provided between the stack body 14 and the end plate 20b (the other of the end plates). The insulators 18a, 18b are made of insulating material such as polycarbonate (PC), phenol resin, etc.

Each of the end plates 20a, 20b has a laterally elongated (or longitudinally elongated) rectangular shape, and coupling bars 24 are disposed between the sides of the end plates 20a, 20b. Both ends of each of the coupling bars 24 are fixed to inner surfaces of the end plates 20a, 20b, to apply a tightening load in the stacking direction (indicated by the arrow A) to the plurality of power generation cells 12 that are stacked together. It should be noted that the fuel cell stack 10 may include a casing including the end plates 20a, 20b, and the stack body 14 may be placed in the casing.

Figure 2:
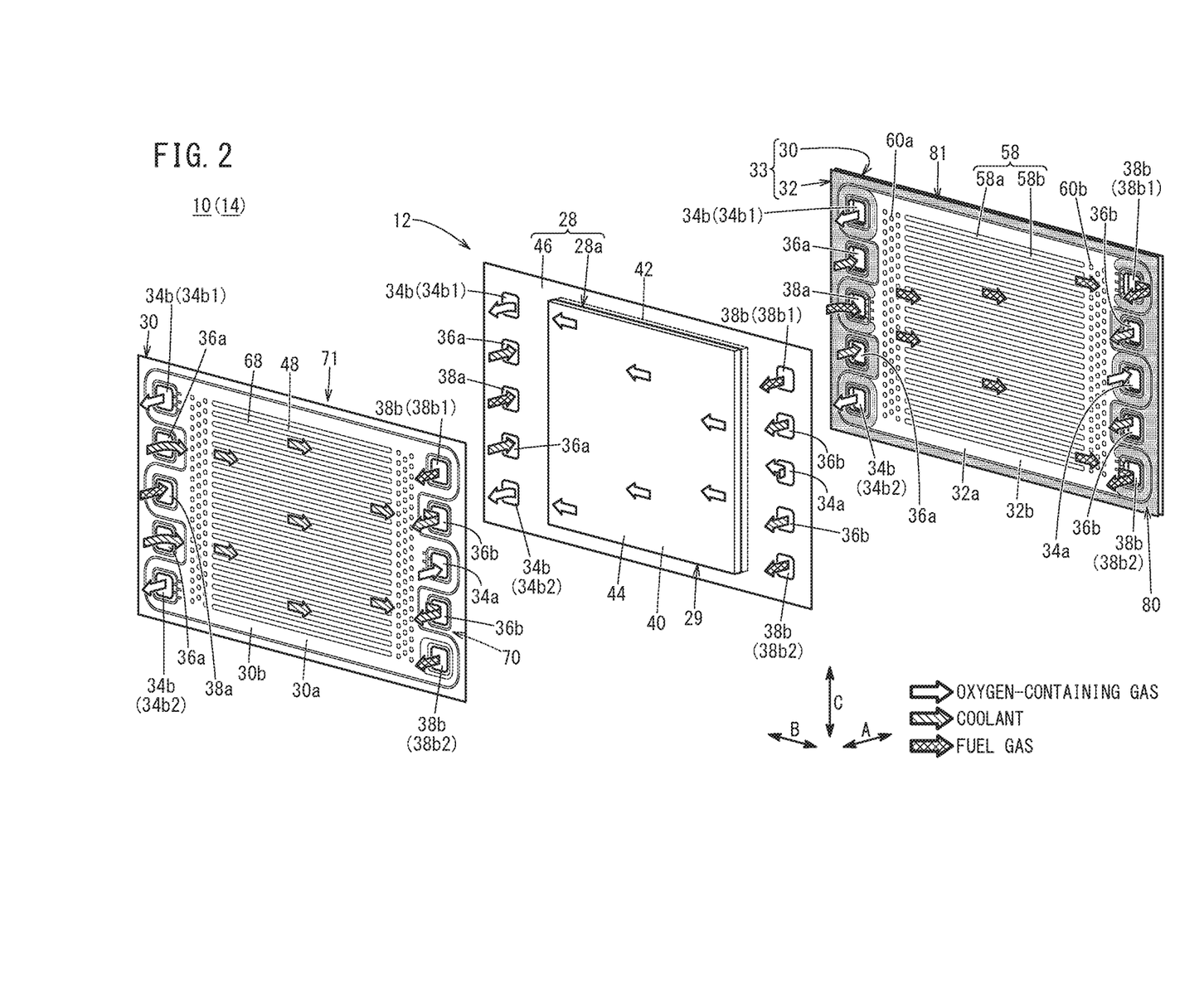
FIG. 2 is an exploded perspective view showing a power generation cell.

As shown in FIG. 2, the power generation cell 12 includes a resin frame equipped MEA 28, and a first metal separator 30 and a second metal separator 32 sandwiching the resin frame equipped MEA 28. Each of the first metal separator 30 and the second metal separator 32 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment.

The resin frame equipped MEA 28 includes a membrane electrode assembly 28a (hereinafter referred to as the "MEA 28a"), and a resin frame member 46 (resin frame portion, a resin film) joined to the outer peripheral portion of the MEA 28a and formed around the outer peripheral portion. The MEA 28a includes an electrolyte membrane 40, a cathode 44 provided on one surface of the electrolyte membrane 40, and an anode 42 provided on the other surface of the electrolyte membrane 40.

For example, the electrolyte membrane 40 is a solid polymer electrolyte membrane (cation ion exchange membrane). For example, the solid polymer electrolyte membrane is a thin membrane of perfluorosulfonic acid containing water. The electrolyte membrane 40 is held between the anode 42 and the cathode 44. A fluorine based electrolyte may be used as the electrolyte membrane 40. Alternatively, an HC (hydrocarbon) based electrolyte may be used as the electrolyte membrane 40.

Although not shown, the anode 42 includes a first electrode catalyst layer joined to one surface of the electrolyte membrane 40, and a first gas diffusion layer stacked on the first electrode catalyst layer. The cathode 44 includes a second electrode catalyst layer joined to the other surface of the electrolyte membrane 40, and a second gas diffusion layer stacked on the second electrode catalyst layer. The resin frame member 46 is provided on the outer peripheral side of a power generation surface 29 of the MEA 28.

At one end of the power generation cells 12 in the longitudinal direction indicated by the arrow B (horizontal direction in FIG. 2), an oxygen-containing gas supply passage 34a, a plurality of coolant discharge passages 36b, and a plurality of (two, as in the case of the illustrated embodiment) fuel gas discharge passages 38b are provided. The oxygen-containing gas supply passage 34a, the plurality of coolant discharge passages 36b, and the plurality of fuel gas discharge passages 38b extend through the stack body 14, the insulator 18a, and the end plate 20a in the stacking direction (or may extend through the terminal plate 16a). These passages 34a, 36b, 38b are arranged in the upper/lower direction (in the direction along the short sides of the power generation cells 12 having a rectangular shape). A fuel gas (one of reactant gases) such as a hydrogen-containing gas is discharged through the fuel gas discharge passages 38b. An oxygen-containing gas (the other of the reactant gases) is supplied to the oxygen-containing gas supply passage 34a. A coolant is discharged through the coolant discharge passages 36b.

The oxygen-containing gas supply passage 34a is disposed between the two coolant discharge passages 36b that are spaced from each other in the upper/lower direction. The plurality of fuel gas discharge passages 38b include an upper fuel gas discharge passage 38b1 and a lower fuel gas discharge passage 38b2. The upper fuel gas discharge passage 38b1 is disposed above the upper coolant discharge passage 36b. The lower fuel gas discharge passage 38b2 is disposed below the lower coolant discharge passage 36b.

At the other end of the power generation cell 12 in the direction indicated by the arrow B, a fuel gas supply passage 38a, a plurality of coolant supply passages 36a and a plurality of (two, as in the case of the illustrated embodiment) oxygen-containing gas discharge passages 34b are provided. The fuel gas supply passage 38a, the plurality of coolant supply passages 36a, and the plurality of oxygen-containing gas discharge passages 34b extend through the stack body 14, the insulator 18a, and the end plate 20a in the stacking direction (or may extend through the terminal plate 16a). These passages 38a, 36a, 34b are arranged in the upper/lower direction (in the direction along the short sides of the power generation cells 12 having a rectangular shape). The fuel gas is supplied through the fuel gas supply passage 38a. The oxygen-containing gas is discharged through the oxygen-containing gas discharge passages 34b. The coolant is supplied through the coolant supply passages 36a.

The fuel gas supply passage 38a is disposed between the two coolant supply passages 36a that are spaced from each other in the upper/lower direction. The plurality of oxygen-containing gas discharge passages 34b include an upper oxygen-containing gas discharge passage 34b1 and a lower oxygen-containing gas discharge passage 34b2. The upper oxygen-containing gas discharge passage 34b1 is disposed above the upper coolant supply passage 36a. The lower oxygen-containing gas discharge passage 34b2 is disposed below the lower coolant supply passage 36a.

The layout, the shapes, and the sizes of the oxygen-containing gas supply passage 34a, the plurality of oxygen-containing gas discharge passages 34b, the fuel gas supply passage 38a, and the plurality of fuel gas discharge passages 38b are not limited to the illustrated embodiment, and may be determined as necessary depending on the required specification.

As shown in FIG. 2, at one of the resin frame member 46 in the direction indicated by the arrow B, the one oxygen-containing gas supply passage 34a, the plurality of coolant discharge passages 36b, and the plurality of fuel gas discharge passages 38b are provided. At the other end of the resin frame member 46 in the direction indicated by the arrow B, the one fuel gas supply passage 38a, the plurality of coolant supply passages 36a, and the plurality of oxygen-containing gas discharge passages 34b are provided.

It should be noted that the electrolyte membrane 40 may protrude outward without using the resin frame member 46. Further, frame shaped films may be provided on both sides of the electrolyte membrane 40 which protrudes outward.

Figure 3:
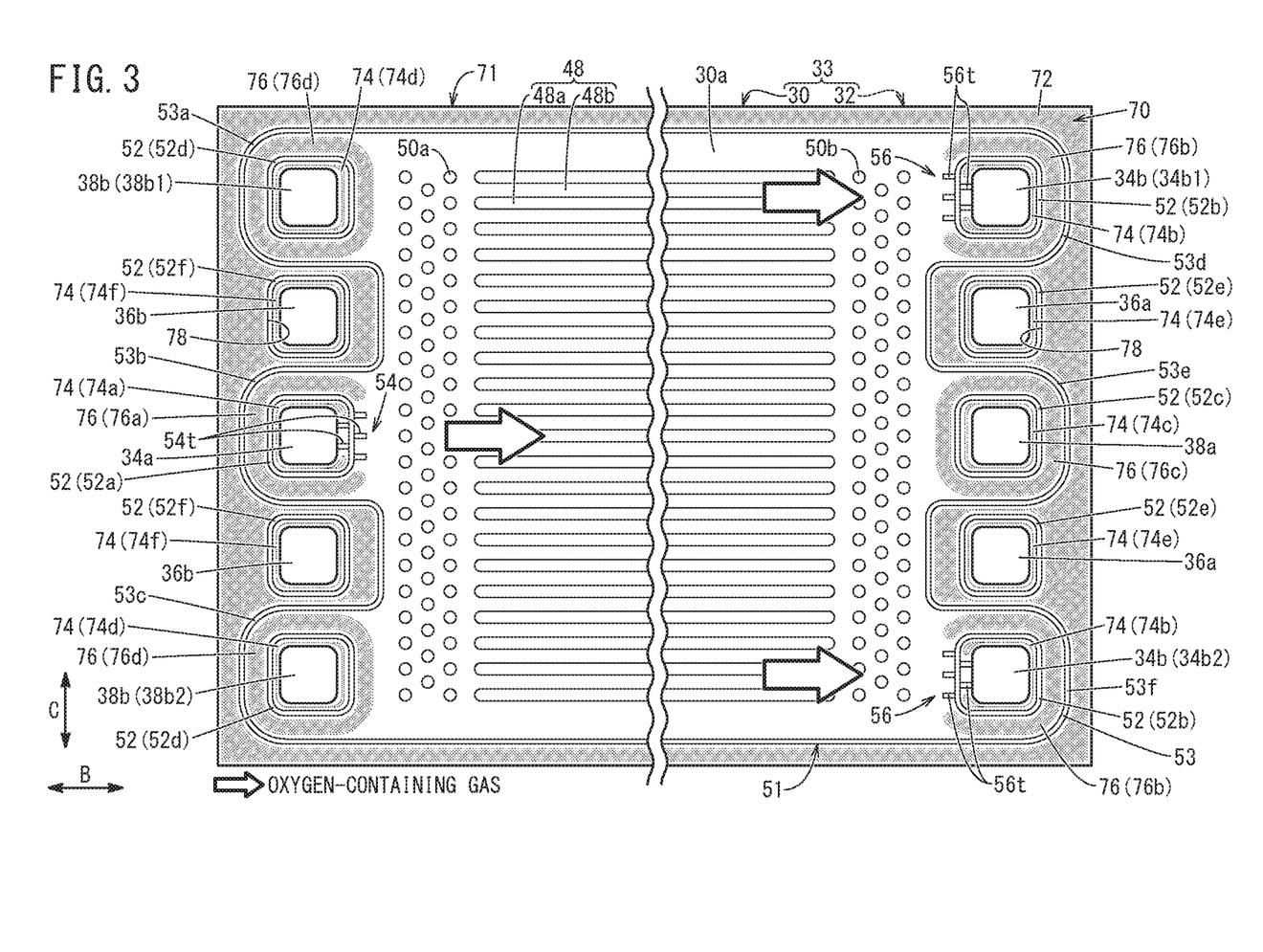
FIG. 3 is a view showing structure of a joint separator, as viewed from a side where a first metal separator is present.

As shown in FIG. 3, the first metal separator 30 has, on its surface 30a facing the MEA 28, an oxygen-containing gas flow field 48 (reactant gas flow field) extending in the direction indicated by the arrow B, for example. The oxygen-containing gas flow field 48 is connected to (in fluid communication with) the oxygen-containing gas supply passage 34a and the oxygen-containing gas discharge passages 34b. The oxygen-containing gas flow field 48 comprises straight flow grooves (or wavy flow grooves) 48b between a plurality of ridges 48a extending in the direction indicated by the arrow B.

An inlet buffer 50a including a plurality of bosses are provided by press forming, between the oxygen-containing gas supply passage 34a and the oxygen-containing gas flow field 48. An outlet buffer 50b including a plurality of bosses are provided by press forming, between the oxygen-containing gas discharge passages 34b and the oxygen-containing gas flow field 48.

Figure 5:
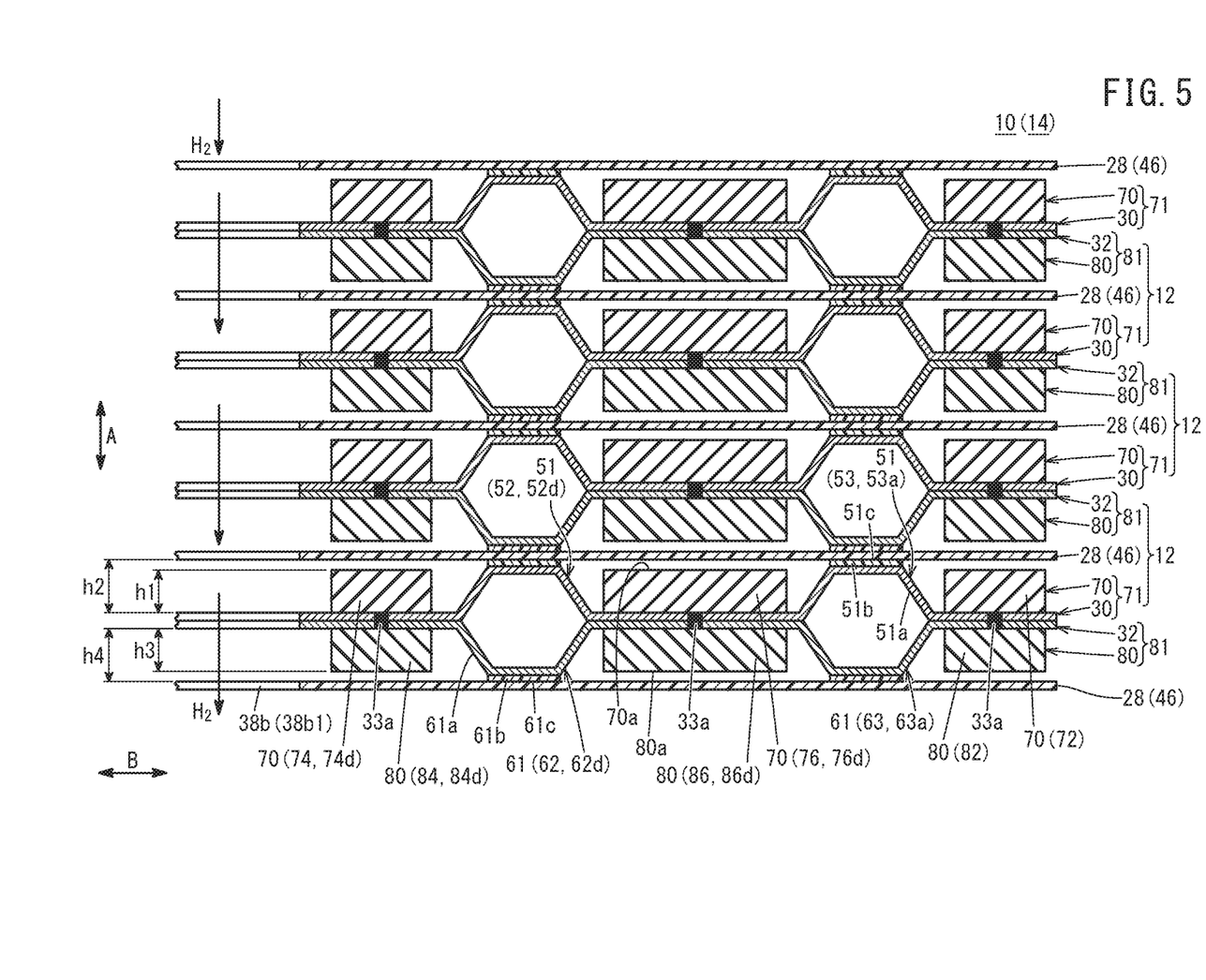
FIG. 5 is a cross sectional view with partial omission, showing a fuel cell stack at a position corresponding to a line V-V in FIG. 4.

A seal bead 51 for preventing leakage of fluid (the fuel gas, the oxygen-containing gas, and the coolant) is provided on the surface 30a of the first metal separator 30. In FIG. 5, the seal bead 51 includes a bead body 51a formed by press forming, to protrude integrally toward the resin frame member 46, and a resin member 51b adhered to a protruding end surface of the bead body 51a by printing or coating. The bead body 51a has a trapezoidal shape in lateral cross section. However, the lateral cross sectional shape of the bead body 51a can be changed as necessary, and may be, for example, a circular arc shape. The resin member 51b may be dispensed with. The seal bead 51 tightly contacts the resin frame member 46, and has seal structure which is deformed elastically by a tightening force in the stacking direction, to seal a portion between the seal bead 51 and the resin frame member 46 in an air tight and liquid tight manner.

In FIG. 3, the seal bead 51 includes a plurality of passage beads 52 (52a to 52f), and an outer bead 53.

The passage bead 52a is formed around the oxygen-containing gas supply passage 34a. The passage beads 52b are formed around the two oxygen-containing gas discharge passages 34b, respectively. The passage bead 52c is formed around the fuel gas supply passage 38a. The passage beads 52d are formed around the two fuel gas discharge passages 38b, respectively. The passage beads 52e are formed around the two coolant supply passages 36a. The passage beads 52f are formed around the two coolant discharge passages 36b, respectively.

The passage bead 52a around the oxygen-containing gas supply passage 34a is provided with a bridge section 54 including a plurality of tunnels 54t connecting the oxygen-containing gas supply passage 34a and the oxygen-containing gas flow field 48. Each of the passage beads 52b around the oxygen-containing discharge passages 34b is provided with a bridge section 56 including a plurality of tunnels 56t connecting the oxygen-containing gas discharge passage 34b and the oxygen-containing gas flow field 48.

The outer bead 53 is provided along the outer peripheral portion of the first metal separator 30, around the oxygen-containing gas flow field 48, the oxygen-containing gas supply passage 34a, the two oxygen-containing gas discharge passages 34b, the fuel gas supply passage 38a, and the two fuel gas discharge passages 38b.

At one end of the first metal separator 30 in the longitudinal direction, the outer bead 53 extends in a serpentine pattern, between the upper fuel gas discharge passage 38b1 and the upper coolant discharge passage 36b, between the upper coolant discharge passage 36b and the oxygen-containing gas supply passage 34a, between the oxygen-containing gas supply passage 34a and the lower coolant discharge passage 36b, and between the lower coolant discharge passage 36b and the lower fuel gas discharge passage 38b2. Therefore, at one end of the first metal separator 30 in the longitudinal direction, the outer bead 53 includes three expanded portions 53a, 53b, 53c expanded toward one of the short sides of the first metal separator 30, and partially surrounding the upper fuel gas discharge passage 38b1, the oxygen-containing gas supply passage 34a, and the lower fuel gas discharge passage 38b2, respectively.

At the other end of the first metal separator 30 in the longitudinal direction, the outer bead 53 extends in a serpentine pattern, between the upper oxygen-containing gas discharge passage 34b1 and the upper coolant supply passage 36a, between the upper coolant supply passage 36a and the fuel gas supply passage 38a, between the fuel gas supply passage 38a and the lower coolant supply passage 36a, and between the lower coolant supply passage 36a and the lower oxygen-containing gas discharge passage 34b2. Therefore, at the other end of the first metal separator 30 in the longitudinal direction, the outer bead 53 includes three expanded portions 53d, 53e, 53f expanded toward the other of the short sides of the first metal separator 30, and partially surrounding the upper oxygen-containing gas discharge passage 34b1, the fuel gas supply passage 38a, and the lower oxygen-containing gas discharge passage 34b2, respectively.

Figure 4:
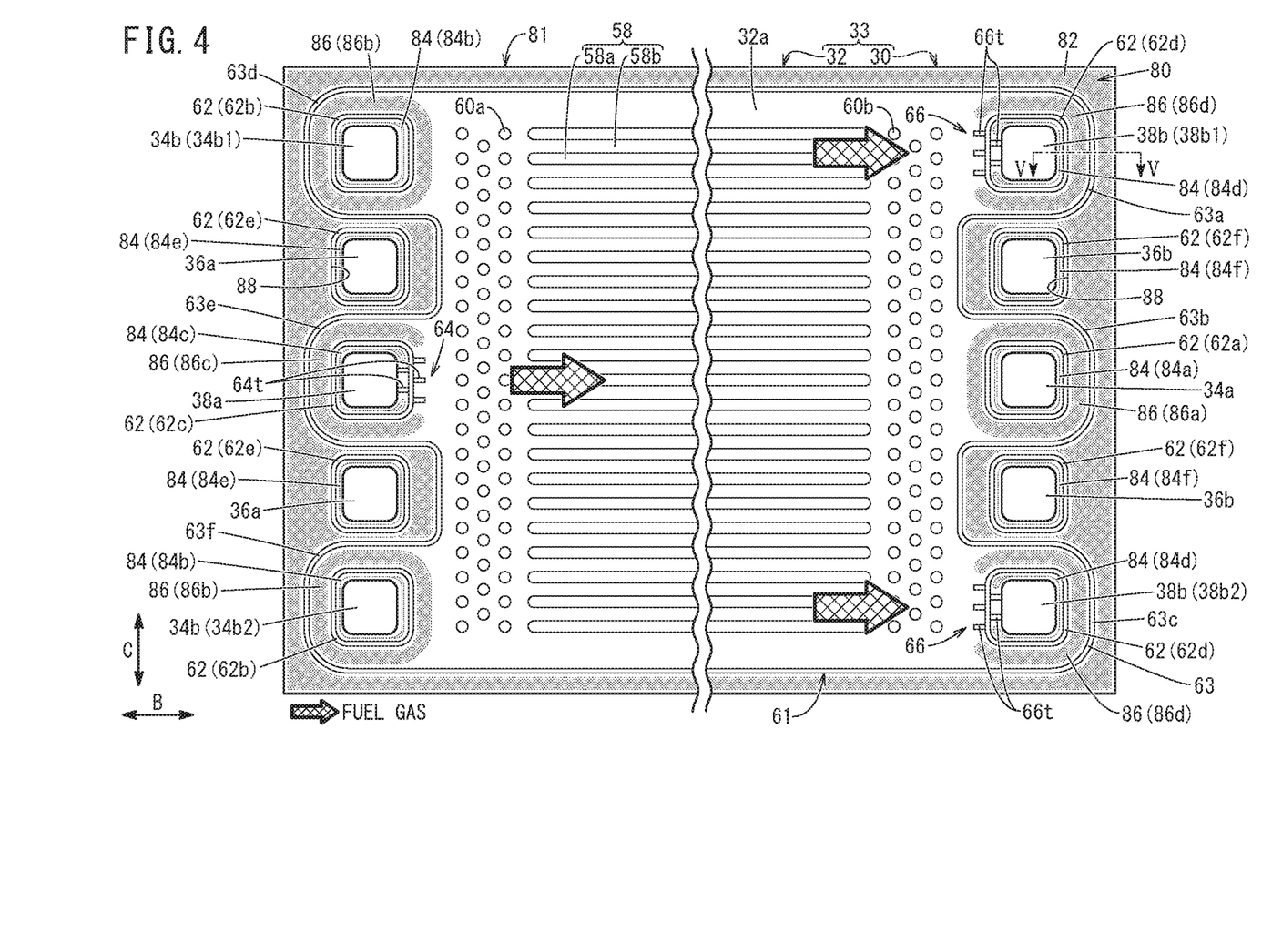
FIG. 4 is a view showing structure of the joint separator, as viewed from a side where a second metal separator is present.

As shown in FIG. 4, the second metal separator 32 has, on its surface 32a facing the resin frame equipped MEA 28, a fuel gas flow field 58 (reactant gas flow field) extending in the direction indicated by the arrow B, for example. The fuel gas flow field 58 is connected to (in fluid communication with) the fuel gas supply passage 38a and the fuel gas discharge passages 38b. The fuel gas flow field 58 includes straight flow grooves (or wavy flow grooves) 58b between a plurality of ridges 58a extending in the direction indicated by the arrow B.

An inlet buffer 60a including a plurality of bosses are provided by press forming, between the fuel gas supply passage 38a and the fuel gas flow field 58. An outlet buffer 60b including a plurality of bosses are provided by press forming, between the fuel gas discharge passages 38b and the fuel gas flow field 58.

A seal bead 61 for preventing leakage of fluid (the fuel gas, the oxygen-containing gas, and the coolant) is provided on the surface 32*a* of the second metal separator 32. In FIG. 5, the seal bead 61 includes a bead body 61*a* formed by press forming, to protrude integrally toward the resin frame member 46, and a resin member 61*b* adhered to a protruding end surface of the bead body 61*a* by printing or coating. The bead body 61*a* has a trapezoidal shape in lateral cross section. However, the lateral cross sectional shape of the bead body 61*a* can be changed as necessary, and may be, for example, a circular arc shape. The resin member 61*b* may be dispensed with. The seal bead 61 tightly contacts the resin frame member 46, and has seal structure which is deformed elastically by a tightening force in the stacking direction, to seal a portion between the seal bead 61 and the resin frame member 46 in an air tight and liquid tight manner.

In FIG. 4, the seal bead 61 includes a plurality of passage beads 62 (62*a* to 62*f*) and an outer bead 63.

The passage bead 62*a* is formed around the oxygen-containing gas supply passage 34*a*. The passage beads 62*b* are formed around the two oxygen-containing gas discharge passages 34*b*, respectively. The passage bead 62*c* is formed around the fuel gas supply passage 38*a*. The passage beads 62*d* are formed around the two fuel gas discharge passages 38*b*. The passage beads 62*e* are formed around the two coolant supply passages 36*a*, respectively. The passage beads 62*f* are formed around the two coolant discharge passages 36*b*, respectively.

The passage bead 62*c* around the fuel gas supply passage 38*a* is provided with a bridge section 64 including a plurality of tunnels 64*t* connecting the fuel gas supply passage 38*a* and the fuel gas flow field 58. Each of the passage beads 62*d* around the fuel gas discharge passages 38*b* is provided with a bridge section 66 including a plurality of tunnels 66*t* connecting the fuel gas discharge passage 38*b* and the fuel gas flow field 58.

The outer bead 63 is provided along the outer peripheral portion of the second metal separator 32, around the fuel gas flow field 58, the oxygen-containing gas supply passage 34*a*, the oxygen-containing gas discharge passages 34*b*, the fuel gas supply passage 38*a*, and the fuel gas discharge passages 38*b*.

At one end of the second metal separator 32 in the longitudinal direction, the outer bead 63 extends in a serpentine pattern, between the upper fuel gas discharge passage 38*b*1 and the upper coolant discharge passage 36*b*, between the upper coolant discharge passage 36*b* and the oxygen-containing gas supply passage 34*a*, between the oxygen-containing gas supply passage 34*a* and the lower coolant discharge passage 36*b*, and between the lower coolant discharge passage 36*b* and the lower fuel gas discharge passage 38*b*2. Therefore, at one end of the second metal separator 32 in the longitudinal direction, the outer bead 63 includes three expanded portions 63*a*, 63*b*, 63*c* expanded toward one of the short sides of the second metal separator 32, and partially surrounding the upper fuel gas discharge passage 38*b*1, the oxygen-containing gas supply passage 34*a*, and the lower fuel gas discharge passage 38*b*2, respectively.

At the other end of the second metal separator 32 in the longitudinal direction, the outer bead 63 extends in a serpentine pattern, between the upper oxygen-containing gas discharge passage 34*b*1 and the upper coolant supply passage 36*a*, between the upper coolant supply passage 36*a* and the fuel gas supply passage 38*a*, between the fuel gas supply passage 38*a* and the lower coolant supply passage 36*a*, and between the lower coolant supply passage 36*a* and the lower oxygen-containing gas discharge passage 34*b*2. Therefore, at the other end of the second metal separator 32 in the longitudinal direction, the outer bead 63 includes three expanded portions 63*d*, 63*e*, 63*f* expanded toward the other of the short sides of the second metal separator 32, and partially surrounding the upper oxygen-containing gas discharge passage 34*b*1, the fuel gas supply passage 38*a*, and the lower oxygen-containing gas discharge passage 34*b*2, respectively.

In FIG. 2, outer ends of the first metal separator 30 and the second metal separator 32 are joined together integrally by welding, brazing, etc. to form a joint separator 33. A coolant flow field 68 is formed between a back surface 30*b* of the first metal separator 30 and a back surface 32*b* of the second metal separator 32. The coolant flow field 68 is connected to (in fluid communication with) the coolant supply passage 36*a* and the coolant discharge passages 36*b*. When the first metal separator 30 and the second metal separator 32 are stacked together, the coolant flow field 68 is formed on the back surface of the oxygen-containing gas flow field 48 formed on the first metal separator 30 and the back surface of the fuel gas flow field 58 formed on the second metal separator 32.

In FIG. 5, the first metal separator 30 and the second metal separator 32 of the joint separator 33 are joined together by a plurality of joining lines 33*a*. For example, the joining line 33*a* is a laser welding line. The joining line 33*a* may be a joining section where the first metal separator 30 and the second metal separator 32 are joined together by MIG, TIG, seam welding, brazing, crimping, etc.

As shown in FIGS. 3 and 5, a first pressure receiving member 70 is provided on the surface 30*a* of the first metal separator 30, along the seal bead 51. A first separator member 71 (fuel cell separator member) is formed by the first metal separator 30 and the first pressure receiving member 70.

The first pressure receiving member 70 receives an impact load (external load) in the stacking direction. The first pressure receiving member 70 is provided separately from the first metal separator 30. Stated otherwise, the first pressure receiving member 70 is provided on the first metal separator 30 so as to be distinguishable from the first metal separator 30. The first pressure receiving member 70 is joined to the surface 30*a* (flat surface) of the first metal separator 30. The first pressure receiving member 70 and the first metal separator 30 are made of different materials. The first pressure receiving member 70 is an elastic member which is elastically deformable in the stacking direction. The first pressure receiving member 70 has a quadrangular shape in cross section. It should be noted that the cross sectional shape of the first pressure receiving member 70 can be determined suitably, and may be a trapezoidal shape, a triangular shape, or a circular arc shape.

For example, the first pressure receiving member 70 is made of PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The first pressure receiving member 70 is provided by transferring a film onto the surface 30*a* of the first metal separator 30. It should be noted that the first pressure receiving member 70 may be provided on the surface 30*a* of the first metal separator 30 by ink jet printing or screen printing. That is, the first pressure receiving member 70 may be provided on the surface 30a of the first metal separator 30 by a suitable method.

In FIG. 5, a height h1 of the first pressure receiving member 70 in the stacking direction (indicated by the arrow A) is lower than a height h2 of the seal bead 51 in the state where the tightening load in the stacking direction is applied to the stack body 14, and no impact load in the stacking direction is applied to the stack body 14 (hereinafter referred to as the "normal tightened state"). In this regard, the height h2 of the seal bead 51 means the length from the surface 30a of the first metal separator 30 (root of the bead body 51a) to the surface of the resin member 51b (seal surface 51c) in the normal tightened state.

Specifically, it is preferable that the height h1 of the first pressure receiving member 70 is not less than the height of the seal bead 51 when the seal bead 51 is deformed in the stacking direction, e.g., at a compression ratio of 20%. It is because, in the case where the impact load is applied in the stacking direction of the stack body 14, a surface 70a of the first pressure receiving member 70 is reliably brought into contact with the resin frame member 46 before the seal bead 51 is deformed excessively, and thus, it is possible to receive the impact load by the first pressure receiving member 70.

In FIGS. 3 and 5, the first pressure receiving member 70 includes an outer member 72, a plurality of hole surrounding members 74 (74a to 74f), and a plurality of intermediate members 76 (76a to 76d). The outer member 72 is formed in an annular shape. The outer marginal portion of the outer member 72 extends along the outer marginal portion of the first metal separator 30. The inner marginal portion of the outer member 72 extends along the outer marginal portion of the outer bead 53. That is, the outer member 72 is disposed between the outer bead 53 and the outer peripheral end of the first metal separator 30.

The outer member 72 extends around the plurality of passage beads 52e, 52f. Stated otherwise, holes 78 are formed in the outer member 72, at positions corresponding to the passage beads 52e around the coolant supply passages 36a, and the passage beads 52f around the coolant discharge passages 36b. The passage beads 52e, 52f are positioned in the holes 78.

The hole surrounding member 74a is provided between the oxygen-containing gas supply passage 34a and the passage bead 52a. The hole surrounding member 74a extends along the oxygen-containing gas supply passage 34a in a manner to avoid the tunnels 54t. The hole surrounding member 74b is provided between the oxygen-containing gas discharge passage 34b and the passage bead 52b. The hole surrounding member 74b extends along the oxygen-containing gas discharge passage 34b in a manner to avoid the tunnels 56t.

The hole surrounding member 74c is provided between the fuel gas supply passage 38a and the passage bead 52c. The hole surrounding member 74c is formed in an annular shape around the fuel gas supply passage 38a. The hole surrounding member 74d is provided between the fuel gas discharge passage 38b and the passage bead 52d. The hole surrounding member 74d is formed in an annular shape around the fuel gas discharge passage 38b.

The hole surrounding member 74e is provided between the coolant supply passage 36a and the passage bead 52e. The hole surrounding member 74e is formed in an annular shape around the coolant supply passage 36a. The hole surrounding member 74f is provided between the coolant discharge passage 36b and the passage bead 52f. The hole surrounding member 74f is formed in an annular shape around the coolant discharge passage 36b.

The intermediate member 76a is provided between the outer bead 53 and the passage bead 52a. The intermediate member 76a extends along the outer periphery of the passage bead 52a in a manner to avoid the tunnels 54t. The intermediate member 76b is provided between the outer bead 53 and the passage bead 52b. The intermediate member 76b extends along the outer periphery of the passage bead 52b in a manner to avoid the tunnels 56t.

The intermediate member 76c is provided between the outer bead 53 and the passage bead 52c. The intermediate member 76c extends in an annular shape along the outer periphery of the passage bead 52c. The intermediate member 76d is provided between the outer bead 53 and the passage bead 52d. The intermediate member 76d extends in an annular shape along the outer periphery of the passage bead 52d.

As shown in FIGS. 4 and 5, a second pressure receiving member 80 is provided on the surface 32a of the second metal separator 32, along the seal bead 61. A second separator member 81 (fuel cell separator member) is formed by the second metal separator 32 and the second pressure receiving member 80.

The second pressure receiving member 80 receives an impact load (external load) in the stacking direction. The second pressure receiving member 80 is provided separately from the second metal separator 32. Stated otherwise, the second pressure receiving member 80 is provided on the second metal separator 32 so as to be distinguishable from the second metal separator 32. The second pressure receiving member 80 is joined to the surface 32a (flat surface) of the second metal separator 32. The second pressure receiving member 80 and the second metal separator 32 are made of different materials. The second pressure receiving member 80 is an elastic member which is elastically deformable in the stacking direction, and is made of the same material as that of the above-described first pressure receiving member 70. The second pressure receiving member 80 has a quadrangular shape in cross section. It should be noted that the cross sectional shape of the second pressure receiving member 80 can be determined suitably, and may be a trapezoidal shape, a triangular shape, or a circular arc shape.

The second pressure receiving member 80 is provided by transferring a film onto the surface 32a of the second metal separator 32. It should be noted that the second pressure receiving member 80 may be provided on the surface 32a of the second metal separator 32 by ink jet printing or screen printing. That is, the second pressure receiving member 80 may be provided on the surface 32a of the second metal separator 32 by a suitable method.

In FIG. 5, a height h3 of the second pressure receiving member 80 in the stacking direction (indicated by the arrow A) is lower than a height h4 of the seal bead 61 in the normal tightened state. In this regard, the height h4 of the seal bead 61 means the length from the surface 32a of the second metal separator 32 (root of the bead body 61a) to the surface of the resin member 61b (seal surface 61c) in the normally tightened state.

Specifically, it is preferable that the height h3 of the second pressure receiving member 80 is not less than the height of the seal bead 61 when the seal bead 61 is deformed in the stacking direction, e.g., at a compression ratio of 20%. It is because, in the case where the impact load is applied in the stacking direction of the stack body 14, a surface 80a of the second pressure receiving member 80 is reliably brought into contact with the resin frame member 46 before the seal bead 61 is deformed excessively, and thus, it is possible to receive the impact load by the second pressure receiving member 80.

As shown in FIGS. 4 and 5, the second pressure receiving member 80 includes an outer member 82, a plurality of hole surrounding members 84 (84a to 84f), and a plurality of intermediate members 86 (86a to 86d). The outer member 82 is formed in an annular shape. The outer marginal portion of the outer member 82 extends along the outer marginal portion of the second metal separator 32. The inner marginal portion of the outer member 82 extends along the outer marginal portion of the outer bead 63. That is, the outer member 82 is disposed between the outer bead 63 and the outer peripheral portion of the second metal separator 32.

The outer member 82 extends around the plurality of passage beads 62e, 62f. Stated otherwise, holes 88 are formed in the outer member 82, at positions corresponding to the passage beads 62e around the coolant supply passages 36a, and the passage beads 62f around the coolant discharge passages 36b. The passage beads 62e, 62f are positioned in the holes 88.

The hole surrounding member 84a is provided between the oxygen-containing gas supply passage 34a and the passage bead 62a. The hole surrounding member 84a is formed in an annular shape around the oxygen-containing gas supply passage 34a. The hole surrounding member 84b is provided between the oxygen-containing gas discharge passage 34b and the passage bead 62b. The hole surrounding member 84b is formed in an annular shape around the oxygen-containing gas discharge passage 34b.

The hole surrounding member 84c is provided between the fuel gas supply passage 38a and the passage bead 62c. The hole surrounding member 84c extends along the fuel gas supply passage 38a in a manner to avoid the tunnels 64t. The hole surrounding member 84d is provided between the fuel gas discharge passage 38b and the passage bead 62d. The hole surrounding member 84d extends along the fuel gas discharge passage 38b in a manner to avoid the tunnels 66t.

The hole surrounding member 84e is provided between the coolant supply passage 36a and the passage bead 62e. The hole surrounding member 84e is formed in an annular shape around the coolant supply passage 36a. The hole surrounding member 84f is provided between the coolant discharge passage 36b and the passage bead 62f. The hole surrounding member 84f is formed in an annular shape around the coolant discharge passage 36b.

The intermediate member 86a is provided between the outer bead 63 and the passage bead 62a. The intermediate member 86a extends in an annular shape along the outer periphery of the passage bead 62a. The intermediate member 86b is provided between the outer bead 63 and the passage bead 62b. The intermediate member 86b extends in an annular shape along the outer periphery of the passage bead 62b.

The intermediate member 86c is provided between the outer bead 63 and the passage bead 62c. The intermediate member 86c extends along the outer periphery of the passage bead 62c in a manner to avoid the tunnels 64t. The intermediate member 86d is provided between the outer bead 63 and the passage bead 62d. The intermediate member 86d extends along the outer periphery of the passage bead 62d in a manner to avoid the tunnels 66t.

Operation of the fuel cell stack 10 having the above structure will be described below.

Firstly, as shown in FIG. 1, the oxygen-containing gas is supplied to the oxygen-containing gas supply passage 34a of the end plate 20a. The fuel gas is supplied to the fuel gas supply passage 38a of the end plate 20a. The coolant is supplied to the coolant supply passage 36a of the end plate 20a.

As shown in FIG. 3, the oxygen-containing gas flows from the oxygen-containing gas supply passage 34a into the oxygen-containing gas flow field 48 of the first metal separator 30. The oxygen-containing gas flows along the oxygen-containing gas flow field 48 in the direction indicated by the arrow B, and is supplied to the cathode 44 of the MEA 28a shown in FIG. 2.

As shown in FIG. 4, the fuel gas flows from the fuel gas supply passage 38a into the fuel gas flow field 58 of the second metal separator 32. The fuel gas flows along the fuel gas flow field 58 in the direction indicated by the arrow B, and is supplied to the anode 42 of the MEA 28a shown in FIG. 2.

Thus, in each of the MEAs 28a, the oxygen-containing gas supplied to the cathode 44 and the fuel gas supplied to the anode 42 are partially consumed in electrochemical reactions in the second electrode catalyst layer and the first electrode catalyst layer to perform power generation.

Then, the oxygen-containing gas supplied to the cathode 44 is partially consumed at the cathode 44, and discharged along the oxygen-containing gas discharge passage 34b in the direction indicated by the arrow A. Likewise, the fuel gas supplied to the anode 42 is partially consumed at the anode 42, and discharged along the fuel gas discharge passage 38b in the direction indicated by the arrow A.

Further, the coolant supplied to the coolant supply passage 36a is guided into the coolant flow field 68 formed between the first metal separator 30 and the second metal separator 32, and then, the coolant flows in the direction indicated by the arrow B. After the coolant cools the MEA 28a, the coolant is discharged from the coolant discharge passages 36b.

In this case, the embodiment of the present invention offers the following advantages.

In the embodiment of the present invention, the first separator member 71 includes, on the surface 30a of the first metal separator 30, the first pressure receiving member 70 that is provided separately from the first metal separator 30 and receives the impact load in the stacking direction. The height h1 of the first pressure receiving member 70 in the stacking direction is lower than the height h2 of the seal bead 51 in the stacking direction in the normally tightened state.

The second separator member 81 includes, on the surface 32a of the second metal separator 32, the second pressure receiving member 80 that is provided separately from the second metal separator 32 and receives the impact load in the stacking direction. The height h3 of the second pressure receiving member 80 in the stacking direction is lower than the height h4 of the seal bead 61 in the stacking direction in the normally tightened state.

Figure 6:
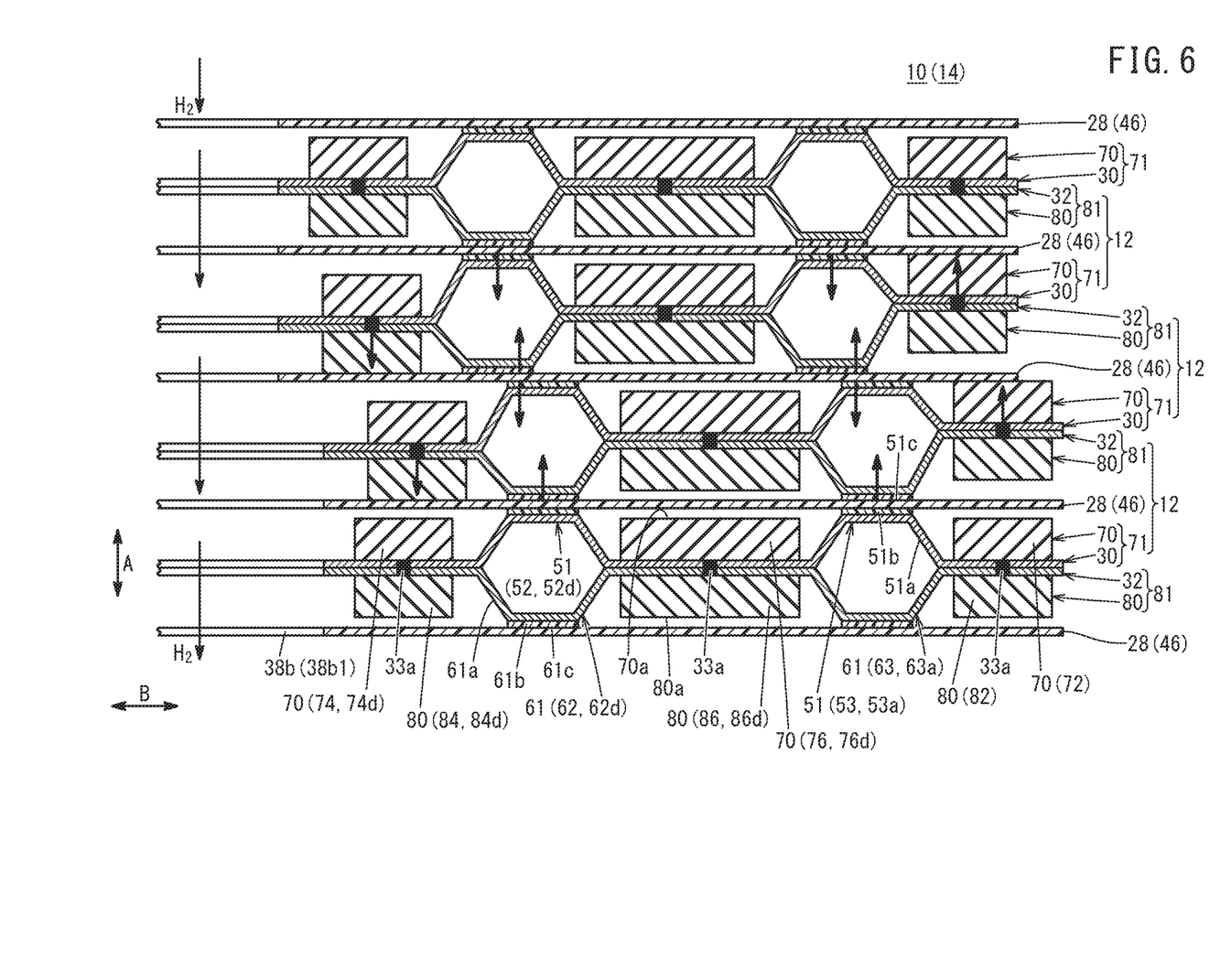
FIG. 6 is a cross sectional view with partial omission, at a position where a seal bead is shifted in a surface direction.

As shown in FIG. 6, in the state where the positions of the seal bead 51 and the seal bead 61 are shifted from each other in the surface direction (direction perpendicular to the stacking direction), when the tightening load in the stacking direction is applied, moment is generated in the joint separator 33. Therefore, the surface 70a of the first pressure receiving member 70 (e.g., the outer member 72) contacts the resin frame member 46, and the surface 80a of the second pressure receiving member 80 (e.g., the hole surrounding member 84d) contacts the resin frame member 46. That is, the moment generated in the joint separator 33 can be received by the first pressure receiving member 70 and the second pressure receiving member 80. Therefore, it is possible to suppress inclination of the seal surfaces 51c, 61c of the seal beads 51, 61 from the surface direction.

Further, as shown in FIG. 5, in the portion where the positions of the seal bead 51 and the seal bead 61 are not shifted from each other in the surface direction, no tightening load is applied to the surface 70a of the first pressure receiving member 70 and the surface 80a of the second pressure receiving member 80. Therefore, it is possible to reliably apply the tightening load to the seal beads 51, 61. Thus, it is possible to achieve the desired sealing performance of the seal bead 51.

Figure 7:
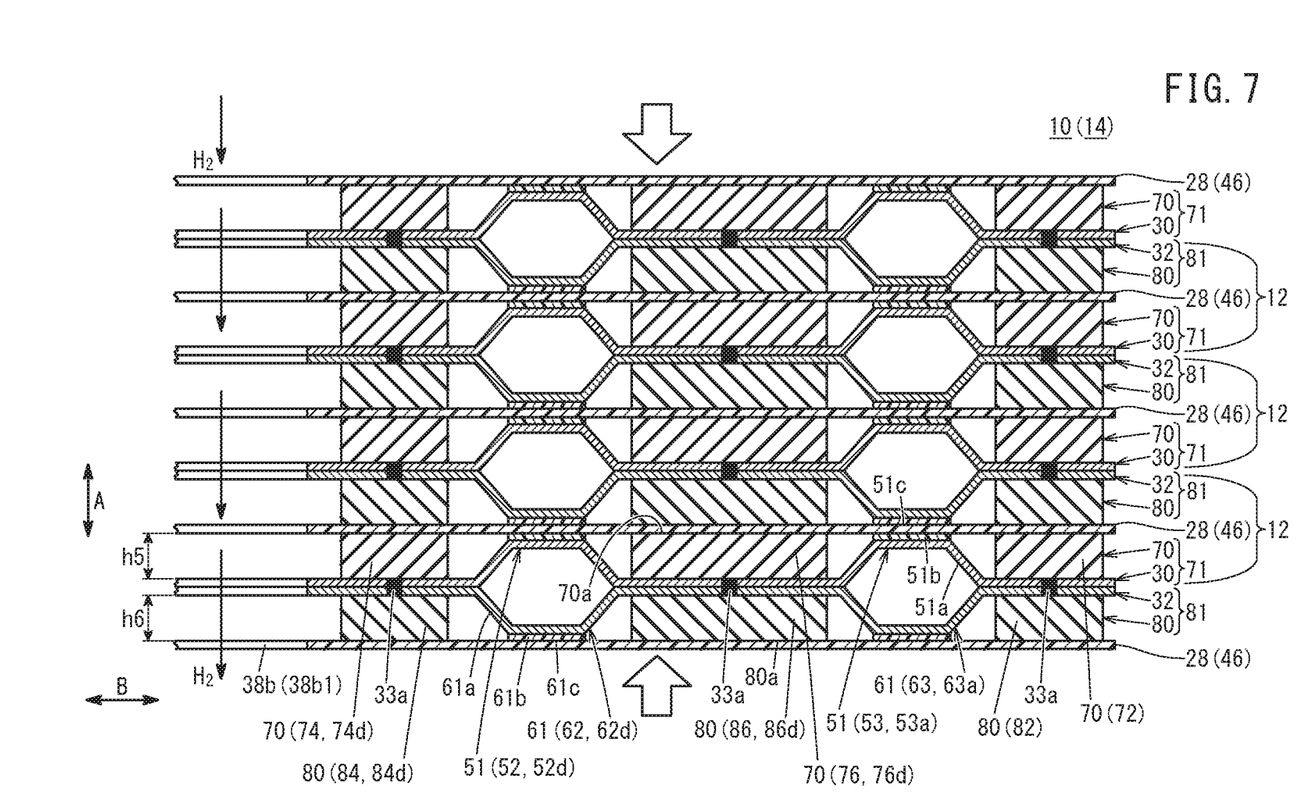
FIG. 7 is a cross sectional view with partial omission, showing the fuel cell stack in a state where an impact load in a stacking direction is applied to the fuel cell stack.

Further, in the case where the fuel cell stack 10 is mounted in the vehicle, when vehicle collision occurs, the impact load may be applied inward in the stacking direction of the stack body 14, to the fuel cell stack 10. In this case, as shown in FIG. 7, the seal bead 51 is elastically deformed (deformed by compression), and the resin frame member 46 contacts the surface 70a of the first pressure receiving member 70 and the surface 80a of the second pressure receiving member 80. Therefore, the impact load can be received not only by the seal beads 51, 61 but also by the first pressure receiving member 70 and the second pressure receiving member 80. Therefore, since concentration of the impact load on the seal bead 51 can be suppressed, it is possible to improve the impact load resistance characteristics.

Figure 8:
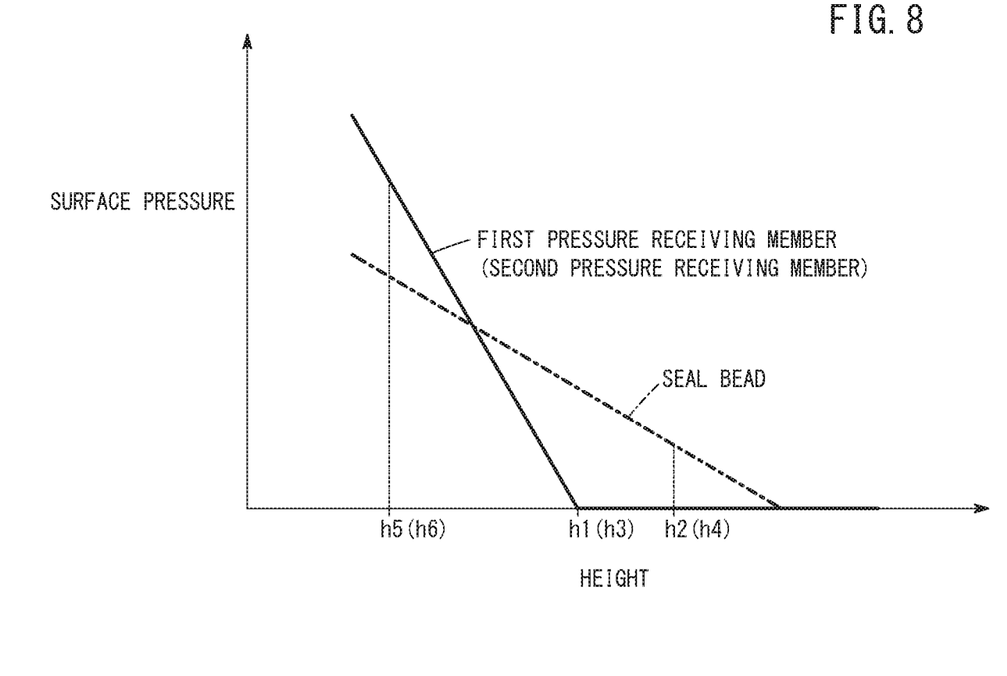
FIG. 8 is a graph showing the heights of a seal bead, a first pressure receiving member, and a second pressure receiving member and the surface pressures applied to the seal bead, the first pressure receiving member, and the second pressure receiving member.

That is, as shown in FIGS. 7 and 8, when an impact load is applied, the seal beads 51, 61 are deformed by compression, and the surface pressure applied to the seal beads 51, 61 is increased. Further, when the height of the seal bead 51 is reduced to the height h1 of the first pressure receiving member 70, the resin frame member 46 contacts the surface 70a of the first pressure receiving member 70, and when the height of the seal bead 61 is reduced to the height h3 of the second pressure receiving member 80, the resin frame member 46 contacts the surface 80a of the second pressure receiving member 80.

Thereafter, the seal beads 51, 61 are further deformed by compression, and the first pressure receiving member 70 and the second pressure receiving member 80 are deformed elastically (deformed by compression), whereby the surface pressures applied to the first pressure receiving member 70 and the second pressure receiving member 80 are increased. Then, the heights of the seal bead 51 and the first pressure receiving member 70 reach a height h5, and the heights of the seal bead 61 and the second pressure receiving member 80 reach a height h6. At this time, the surface pressures applied to the first pressure receiving member 70 and the second pressure receiving member 80 are higher than the surface pressures of the seal beads 51, 61. As described above, the impact load applied to the fuel cell stack 10 can be received by the seal bead 51, 61, the first pressure receiving member 70 and the second pressure receiving member 80 in a balanced manner.

Each of the first pressure receiving member 70 and the second pressure receiving member 80 is elastically deformable in the stacking direction.

In the structure, the first pressure receiving member 70 and the second pressure receiving member 80 can effectively receive the impact load.

The first pressure receiving member 70 includes the hole surrounding member 74 provided between each of the plurality of passages 34a, 34b, 36a, 36b, 38a, 38b and each of the plurality of passage beads 52. The second pressure receiving member 80 includes the hole surrounding member 84 provided between each of the plurality of passages 34a, 34b, 36a, 36b, 38a, 38b and each of the plurality of passage beads 62.

In the structure, it is possible to achieve the desired sealing performance of the passage beads 52, 62. Further, by the hole surrounding members 74, 84, it is possible to suppress concentration of the impact load on the passage beads 52, 62.

The first pressure receiving member 70 includes the outer member 72 provided between the outer bead 53 and the outer peripheral end of the first metal separator 30. The second pressure receiving member 80 includes the outer member 82 provided between the outer bead 63 and the outer peripheral end of the second metal separator 32.

In the structure, it is possible to achieve the desired sealing performance of the outer beads 53, 63. Further, it is possible to suppress concentration of the impact load on the outer beads 53, 63 by the outer members 72, 82.

The outer member 72 extends along and around the outer periphery of the first metal separator 30. The outer member 82 extends along and around the outer periphery of the second metal separator 32.

In the structure, it is possible to effectively improve the sealing performance of the outer beads 53, 63. Further, it is possible effectively suppress concentration of the impact load on the outer beads 53, 63 by the outer members 72, 82.

The first pressure receiving member 70 includes the intermediate member 76 provided between the passage bead 52 and the outer bead 53. The second pressure receiving member 80 includes the intermediate member 86 provided between the passage bead 62 and the outer bead 63.

In the structure, it is possible to effectively improve the sealing performance of the passage beads 52, 62 and the outer beads 53, 63. Further, it is possible to effectively suppress concentration of the impact load on the outer beads 53, 63 and the passage beads 52, 62 by the intermediate members 76, 86.

The present invention is not limited to the above-described embodiment. Various modifications may be made without departing from the gist of the present invention.

The above embodiment is summarized as follows:

The above embodiment discloses the fuel cell separator member (71, 81) including the metal separator (30, 32) stacked on the membrane electrode assembly (28a) in the stacking direction, the tightening load in the stacking direction being applied to the metal separator. The seal bead (51, 61) protruding from the surface (30a, 32a) of the metal separator where the membrane electrode assembly is positioned is formed on the metal separator. The seal bead is pressed against the resin frame (46) provided on the outer peripheral side of the power generation surface (29) of the membrane electrode assembly by the tightening load to prevent leakage of fluid comprising the reactant gas or the coolant. The fuel cell separator member further includes the pressure receiving member (70, 80) provided on the surface of the metal separator, separately from the metal separator and configured to receive an impact load in the stacking direction. The pressure receiving member is provided along the seal bead, and the height (h1, h3) of the pressure receiving member in the stacking direction is lower than the height (h2, h4) of the seal bead in the stacking direction in the state where the tightening load is applied and the impact load is not applied.

In the fuel cell separator member, the pressure receiving member may be configured to be elastically deformable in the stacking direction.

In the fuel cell separator member, the plurality of passages (34a, 34b, 36a, 36b, 38a, 38b) for the fluid may extend through the metal separator in the stacking direction, the seal bead may include the plurality of passage beads (52, 62)

surrounding the plurality of the passages, respectively, and the pressure receiving member may include the hole surrounding member (74, 84) provided between each of the plurality of passages and each of the plurality of passage beads.

In the fuel cell separator member, the reactant gas flow field (48, 58) configured to supply the reactant gas to the power generation surface may be formed on the surface of the metal separator, the plurality of passages may include the reactant gas passage (34*a*, 34*b*, 38*a*, 38*b*) connected to the reactant gas flow field, the seal bead may include the outer bead (53, 63) surrounding the reactant gas flow field and the reactant gas passage, and the pressure receiving member may include an outer member (72, 82) provided between the outer bead and the outer peripheral end of the metal separator.

In the fuel cell separator member, the outer member may extend along and around the outer periphery of the metal separator.

In the fuel cell separator member, the pressure receiving member may include the intermediate member (76, 86) provided between the outer bead and a passage bead surrounding the reactant gas passage, among the plurality of passage beads.

In the fuel cell separator member, the cross sectional shape of the pressure receiving member along the stacking direction may be a quadrangular shape.

In the fuel cell separator member, the seal bead may include the bead body (51*a*, 61*a*) formed integrally with, and protruding from the surface of the metal separator, and the resin member (51*b*, 61*b*) provided on the protruding end surface of the bead body, and the height of the seal bead in the stacking direction may be the length from the surface of the metal separator to the surface of the resin member.

In the fuel cell separator member, the height of the pressure receiving member in the stacking direction may be determined to be not less than the height of the seal bead when the seal bead is deformed in the stacking direction at a compression ratio of 20%.

The above embodiment discloses the fuel cell stack (10) including the stack body (14) formed by stacking the plurality of power generation cells (12) each including the membrane electrode assembly and the fuel cell separator member provided on each of both sides of the membrane electrode assembly, wherein the fuel cell separator member is the above-described fuel cell separator member.

What is claimed is:

1. A fuel cell separator member comprising:
a metal separator stacked on a membrane electrode assembly in a stacking direction, a tightening load in the stacking direction being applied to the metal separator,
a seal bead protruding from a surface of the metal separator where the membrane electrode assembly is positioned being formed on the metal separator,
the seal bead being pressed against a resin frame provided on an outer peripheral side of a power generation surface of the membrane electrode assembly by the tightening load to prevent leakage of fluid comprising a reactant gas or a coolant,
the fuel cell separator member further comprising a pressure receiving member provided on the surface of the metal separator, separately from the metal separator and configured to receive an impact load in the stacking direction, wherein
the pressure receiving member is provided along the seal bead, and
a height of the pressure receiving member in the stacking direction is lower than a height of the seal bead in the stacking direction in a state where the tightening load is applied and the impact load is not applied.

2. The fuel cell separator member according to claim 1, wherein the pressure receiving member is configured to be elastically deformable in the stacking direction.

3. The fuel cell separator member according to claim 1, wherein:
a plurality of passages for the fluid extend through the metal separator in the stacking direction;
the seal bead includes a plurality of passage beads surrounding the plurality of the passages, respectively; and
the pressure receiving member includes a hole surrounding member provided between each of the plurality of passages and each of the plurality of passage beads.

4. The fuel cell separator member according to claim 3, wherein:
a reactant gas flow field configured to supply the reactant gas to the power generation surface is formed on the surface of the metal separator;
the plurality of passages include a reactant gas passage connected to the reactant gas flow field;
the seal bead includes an outer bead surrounding the reactant gas flow field and the reactant gas passage; and
the pressure receiving member includes an outer member provided between the outer bead and an outer peripheral end of the metal separator.

5. The fuel cell separator member according to claim 4, wherein the outer member extends along and around an outer periphery of the metal separator.

6. The fuel cell separator member according to claim 4, wherein the pressure receiving member includes an intermediate member provided between the outer bead and a passage bead surrounding the reactant gas passage, among the plurality of passage beads.

7. The fuel cell separator member according to claim 1, wherein a cross sectional shape of the pressure receiving member along the stacking direction is a quadrangular shape.

8. The fuel cell separator member according to claim 1, wherein
the seal bead includes:
a bead body formed integrally with, and protruding from the surface of the metal separator; and
a resin member provided on a protruding end surface of the bead body, and
the height of the seal bead in the stacking direction is a length from the surface of the metal separator to a surface of the resin member.

9. The fuel cell separator member according to claim 1, wherein the height of the pressure receiving member in the stacking direction is determined to be not less than the height of the seal bead when the seal bead is deformed in the stacking direction at a compression ratio of 20%.

10. A fuel cell stack comprising a stack body comprising a plurality of stacked power generation cells each including a membrane electrode assembly and a fuel cell separator member provided on each of both sides of the membrane electrode assembly, wherein:
the fuel cell separator member includes a metal separator stacked on the membrane electrode assembly in a stacking direction, a tightening load in the stacking direction being applied to the metal separator;
a seal bead protruding from a surface of the metal separator where the membrane electrode assembly is positioned is formed on the metal separator;

the seal bead is pressed against a resin frame provided on an outer peripheral side of a power generation surface of the membrane electrode assembly by the tightening load to prevent leakage of fluid comprising a reactant gas or a coolant;

the fuel cell separator member further includes a pressure receiving member provided on the surface of the metal separator, separately from the metal separator and configured to receive an impact load in the stacking direction;

the pressure receiving member is provided along the seal bead; and a height of the pressure receiving member in the stacking direction is lower than a height of the seal bead in the stacking direction in a state where the tightening load is applied and the impact load is not applied.

11. The fuel cell stack according to claim 10, wherein the pressure receiving member is configured to be elastically deformable in the stacking direction.

12. The fuel cell stack according to claim 10, wherein:
a plurality of passages for the fluid extend through the metal separator in the stacking direction;
the seal bead includes a plurality of passage beads surrounding the plurality of the passages, respectively; and
the pressure receiving member includes a hole surrounding member provided between each of the plurality of passages and each of the plurality of passage beads.

13. The fuel cell stack according to claim 12, wherein:
a reactant gas flow field configured to supply the reactant gas to the power generation surface is formed on the surface of the metal separator;
the plurality of passages include a reactant gas passage connected to the reactant gas flow field;
the seal bead includes an outer bead surrounding the reactant gas flow field and the reactant gas passage; and
the pressure receiving member includes an outer member provided between the outer bead and an outer peripheral end of the metal separator.

14. The fuel cell stack according to claim 13, wherein the outer member extends along and around an outer periphery of the metal separator.

15. The fuel cell stack according to claim 13, wherein the pressure receiving member includes an intermediate member provided between the outer bead and a passage bead surrounding the reactant gas passage, among the plurality of passage beads.

16. The fuel cell stack according to claim 10, wherein a cross sectional shape of the pressure receiving member along the stacking direction is a quadrangular shape.

17. The fuel cell stack according to claim 10, wherein
the seal bead includes:
a bead body formed integrally with, and protruding from the surface of the metal separator; and
a resin member provided on a protruding end surface of the bead body, and
the height of the seal bead in the stacking direction is a length from the surface of the metal separator to a surface of the resin member.

18. The fuel cell stack according to claim 10, wherein the height of the pressure receiving member in the stacking direction is determined to be not less than the height of the seal bead when the seal bead is deformed in the stacking direction at a compression ratio of 20%.

* * * * *